(12) United States Patent
Ferrara

(10) Patent No.: US 7,832,858 B2
(45) Date of Patent: Nov. 16, 2010

(54) CONTACT LENS PERMITTING TRANSLATION

(76) Inventor: Daniel C. Ferrara, 525 Shakespeare Dr., Virginia Beach, VA (US) 23452

( * ) Notice: Subject to any disclaimer, the term of this patent is extended or adjusted under 35 U.S.C. 154(b) by 259 days.

(21) Appl. No.: 11/803,028

(22) Filed: May 11, 2007

(65) Prior Publication Data

US 2008/0278679 A1    Nov. 13, 2008

(51) Int. Cl.
G02C 7/04 (2006.01)
(52) U.S. Cl. .................... 351/161; 351/160 R
(58) Field of Classification Search .......... 351/160 R, 351/160 H, 161, 177
See application file for complete search history.

(56) References Cited

U.S. PATENT DOCUMENTS

| | | | |
|---|---|---|---|
| 3,950,082 A * | 4/1976 | Volk | 351/169 |
| 4,573,775 A * | 3/1986 | Bayshore | 351/161 |
| 4,614,413 A * | 9/1986 | Obssuth | 351/161 |
| 4,618,228 A | 10/1986 | Baron et al. | |
| 4,702,573 A | 10/1987 | Morstad | |
| 4,976,533 A | 12/1990 | Hahn et al. | |
| 5,062,701 A | 11/1991 | Drazba et al. | |
| 5,344,448 A | 9/1994 | Schneider et al. | |
| 5,606,378 A | 2/1997 | Van Meurs | |
| 5,635,998 A | 6/1997 | Baugh | |
| 6,109,749 A | 8/2000 | Bernstein | |
| 6,746,118 B2 | 6/2004 | Mandell | |
| 7,040,757 B2 | 5/2006 | Hall et al. | |
| 7,052,132 B2 | 5/2006 | Ezekiel | |
| 7,134,753 B2 | 11/2006 | Back | |
| 2006/0170861 A1 | 8/2006 | Lindacher et al. | |

* cited by examiner

*Primary Examiner*—Scott J Sugarman
(74) *Attorney, Agent, or Firm*—FSB FisherBroyles

(57) ABSTRACT

The present invention describes a contact lens of sufficient vertical length when placed on an eye that the lower portion touches the lower fornix of the eye when the eye rotates on a vertical axis, permitting the eye to translate through different vertical portions of the lens as it moves vertically.

13 Claims, 6 Drawing Sheets

CONTACT LENS PERMITTING TRANSLATION

TECHNICAL FIELD

This invention relates generally to contact lenses.

BACKGROUND OF THE INVENTION

Contact lenses are an extremely popular method of vision correction. Unlike glasses, they are all but invisible, and many versions can be worn for extended periods of time. In recent years, contact lenses have been developed that will not rotate once placed on the eye, permitting the use of contact lenses to correct astigmatism as well as myopia.

Unfortunately, although commercially available contact lenses are an excellent choice for vision correction when only one prescription is required per eye, no practical method has yet been developed for permitting a wearer to look through different portions of the contact lens to adjust the degree of vision correction, as is done with multiple-prescription glasses such as bifocals. By their nature, contact lenses are designed to center themselves on the pupil, regardless of whether the wearer moves his eyes up, down, or to the side. Commercially available contact lenses are thus ill-suited to the needs of wearers that require multiple prescriptions.

A number of patents and patent applications attempt to address this dilemma by providing for a contact lens that is thickened at the base, causing the lens to "catch" on the lower lid of the eye and thus permit the eye to translate downward, viewing through a different portion of the contact lens. Unfortunately, this approach has a number of serious drawbacks: the thickened lens can be uncomfortable, and older patients (who are more likely to need bifocals or other multiple prescription lenses) generally have eyelids that are less firm and thus less able to provide the support required to immobilize the lens and permit translation. One variation on this idea, embodied in U.S. Pat. No. 4,702,573, relies upon a thickened "base" pressing against the lower lid to cause a deformation in the lens itself, thus changing the prescription. This approach suffers from the same difficulties as other lens configurations that rely upon the lower lid of the eye, because a loss in elasticity of the lower lid will effectively change the corrective prescription of the lens.

Thus, there is a need for a contact lens that permits the eye to translate from one portion of the lens to another, to allow for viewing through different parts of the lens. The present invention permits this translation by utilizing the lower fornix of the eye (i.e., the bottom of the fold of the fornix where the bulbar conjunctiva meets the palpebral conjunctiva) to stabilize the contact lens, permitting translation of the eye to different portions of the lens. Additional advantages of the invention will be set forth in part in the description that follows, will in party be obvious from the description, or may be learned by practice of the invention. The objects and advantages of the invention will also be realized and attained by means of instrumentalities and combinations particularly pointed out in the appended claims.

SUMMARY OF THE INVENTION

Briefly described, the present invention comprises a contact lens of sufficient size that the lower portion of the lens rests on or near the lower fornix of the eye. When a user looks downward, the bottom of the fold of the conjunctiva, which acts as a barrier to the downward rotation of the lens, rotates downward less than the eye itself rotates, allowing the eye to translate between different portions of the contact lens, thus allowing a contact lens user to utilize more than one prescription on the same contact lens.

Thus, it is an object of this invention to provide a single contact lens that provides a plurality of corrective prescriptions.

It is also an object of this invention to provide a lens with a plurality of foci that does not depend on the lower lid of the eye to permit translation.

Other objects, features, and advantages of the present invention will become apparent upon reading the following specification when taken in conjunction with the accompanying drawings.

DISCLOSURE OF THE INVENTION

Brief Description of the Drawings

The accompanying drawings illustrate a complete embodiment of the invention according to the best modes so far devised for the practical application of the principles thereof, and in which:

FIG. 5 shows three alternative corrective prescription arrangements.

DETAILED DESCRIPTION OF A PREFERRED EMBODIMENT

Figure 1:
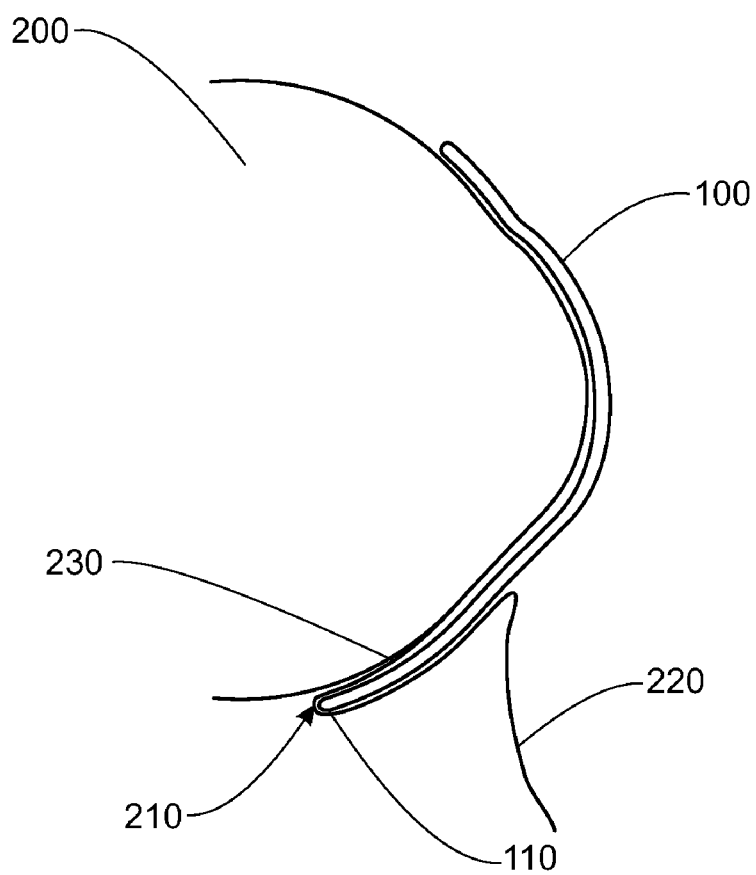
FIG. 1 shows a cutaway side view of a contact lens placed on an eye.

In a preferred embodiment, the shown in FIG. 1, a contact lens 100 is provided, of sufficient vertical height that when placed in the eye 200, the bottom portion of the lens no is in contact with or in close proximity to the lower fornix 210 where the lower eyelid 220 and the eye 200 are connected via the conjunctiva 230. The lower portion of the lens 110 sits behind the lower eyelid 220 but contains no ridges or indentations for accommodating the lower eyelid or any muscles or other structures contained therein, because the lens does not depend on stabilization by the lower eyelid to permit translation.

Figure 2:
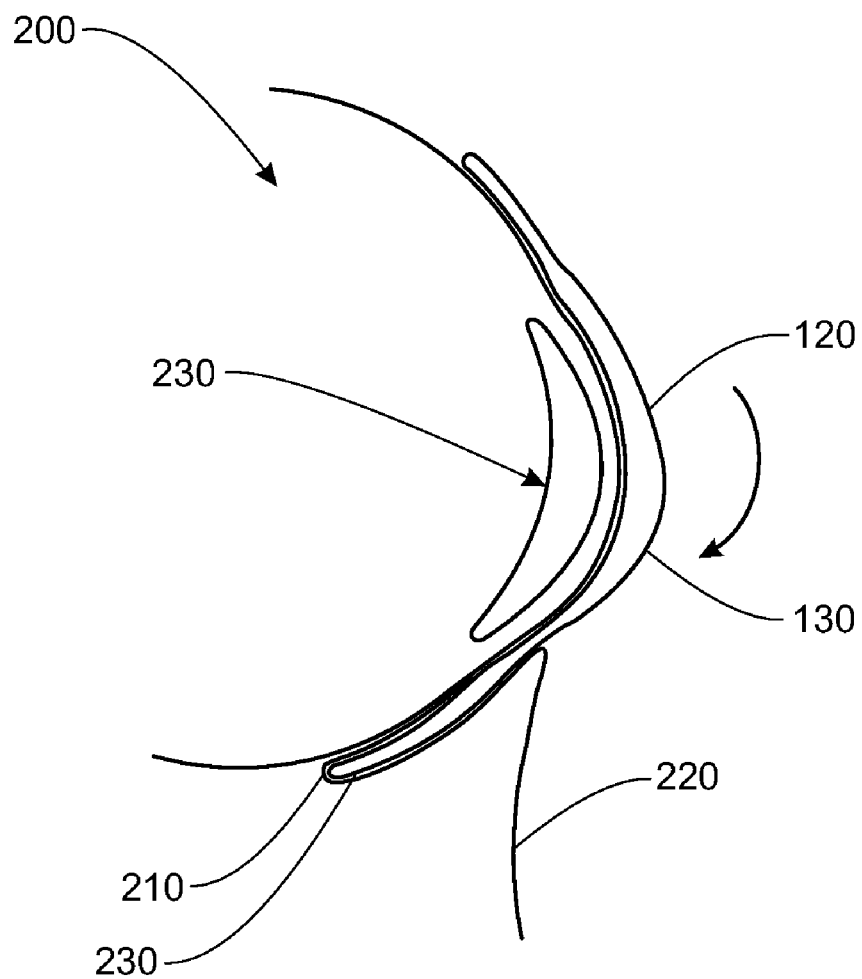
FIG. 2 shows a cutaway side view in which the eye is rotated downward (i.e. the person is looking down).

When the wearer of the lens looks down, as shown in FIG. 2, the location of the lower fornix 210 does not rotate as far as the pupil 230 because of the connection of the conjunctiva 230 to the eye 200. Because its downward rotation is limited by the lower fornix 210, the contact lens does not rotate as much as the pupil 230 either. As a result, as the eye rotates downward, the pupil translates from one point of the lens 120 to a point lower on the lens 130.

Figure 3:
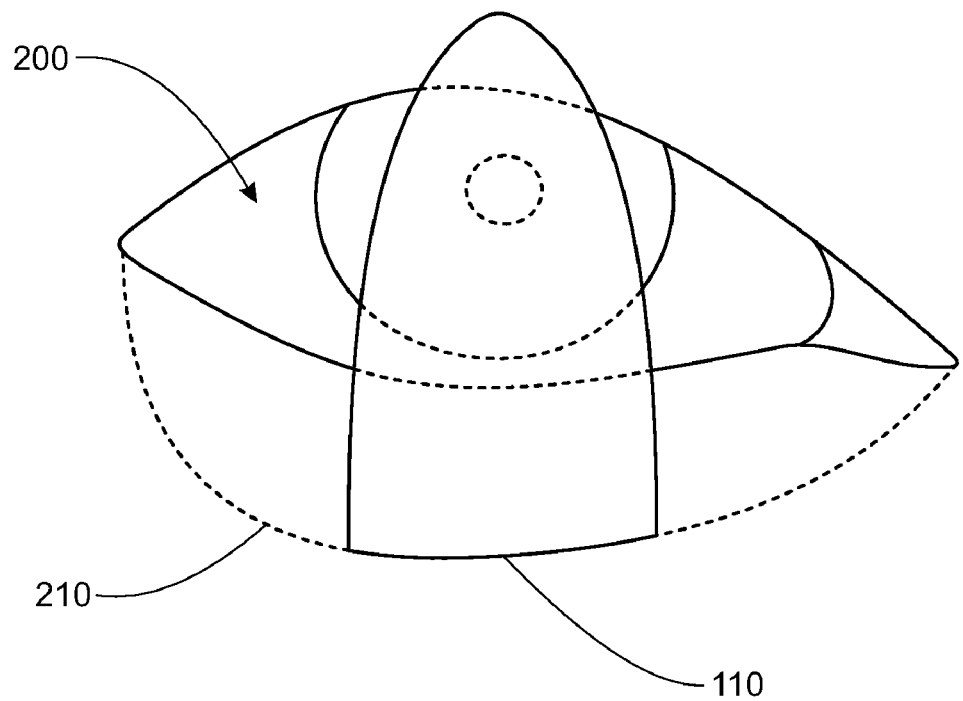
FIG. 3 shows a front view of an eye with the lens placed on the eye, showing a flattened lower edge to prevent rotation of the lens.
Figure 4:
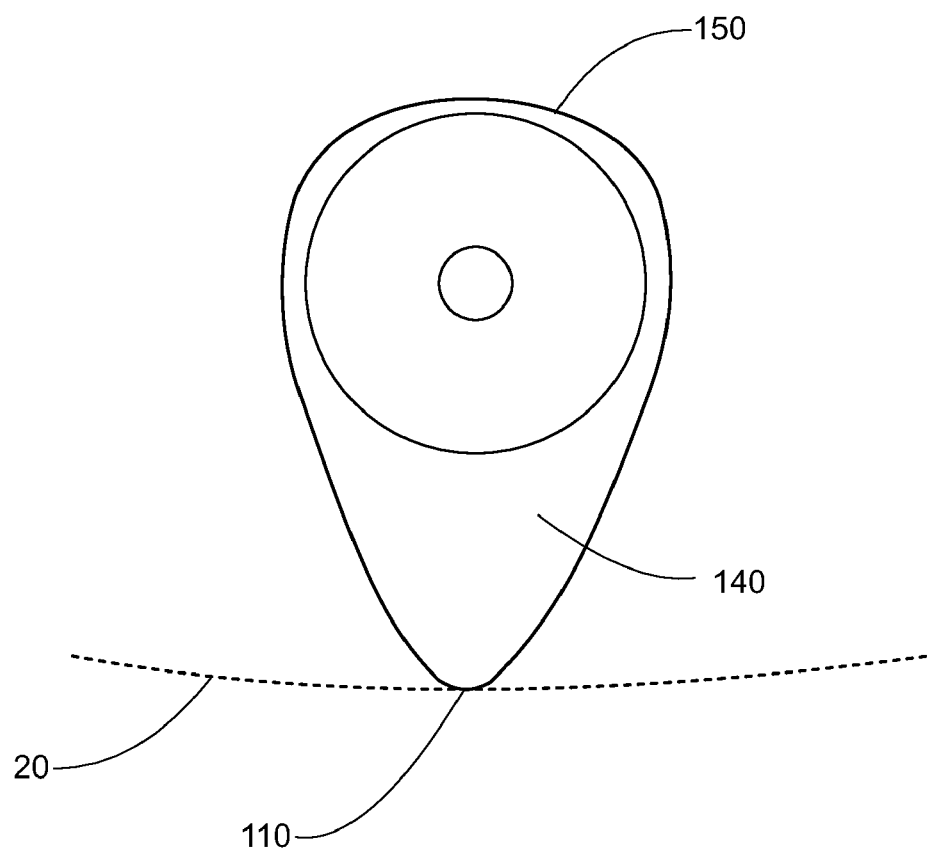
FIG. 4 shows a front view of a lens with ballast zones to prevent rotation.

In one embodiment of the present invention, shown in FIG. 3, the lower edge of the contact lens 100 has a flattened profile to prevent the lens from rotating on the eye 200. In an alternative embodiment, shown in FIG. 4, the lens is prevented from rotating by the use of "ballast zones" 140, 150 at the bottom and/or top of the lens, which are well known in the art for use with toric contact lenses that correct astigmatism.

Other forms of rotational stabilization known in the art, such as the "Dual Thin Zone Design" used in ACUVUE® Brand toric contact lenses, may also be employed.

Figure 5A:
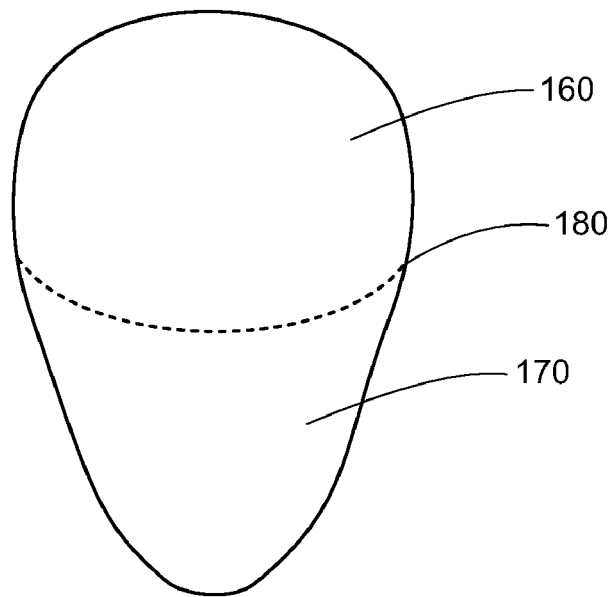
in FIG. 5a, two different prescriptions are directly adjacent.
Figure 5B:
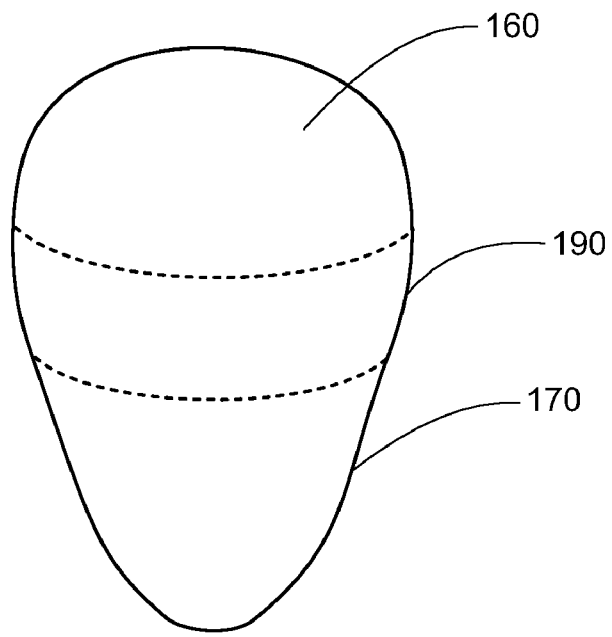
in FIG. 5b, they are separated by a transition zone with an intermediate or graduated prescription.
Figure 5C:
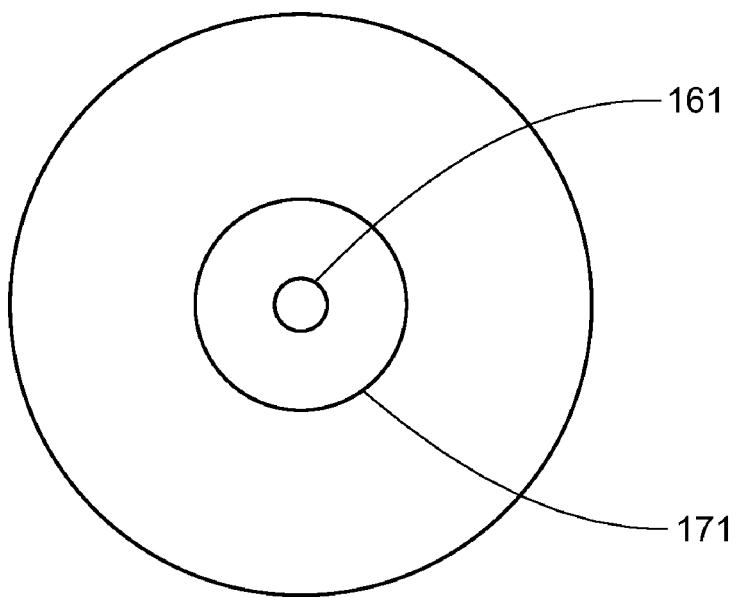
FIG. 5c shows a two prescription embodiment, with one prescription encircling the other.

Because the eye can translate from one position on the lens to another, it is thus possible to provide a lens with two, three or even more distinct prescriptions at different points on the vertical axis of the lens. As shown in FIG. 5, a lens may have two or more zones 160, 170 with different prescription strengths. These zones can be directly adjacent to one another as in FIG. 5a, or may be separated by a transition zone 190 with an intermediate prescription or a continuously variable corrective prescription from one zone to the other, as shown in FIG. 5b. Alternatively, the lens can contain a continuous transition between one prescription strength and another (not shown). In an alternative embodiment, shown in FIG. 5c, one central prescription 161 is surrounded by a second prescription 171. This configuration permits translation even if the lens has rotated in the eye.

What is claimed is:

1. A contact lens of sufficient vertical length that when placed on an eye, if the eye rotates on a vertical axis, the lower portion of the lens, which sits behind the lower eyelid of said eye but contains no depression to accommodate said lower eyelid or any portion thereof, is prevented from rotating to the same degree as the eye by the lower fornix of the eye, permitting the eye to translate through different vertical portions of the lens as it moves vertically.

2. The lens of claim 1, further comprised of a plurality of corrective lenses.

3. The lens of claim 2, in which there are two separate corrective prescriptions.

4. The lens of claim 2, in which there are three separate corrective lenses.

5. The lens of claim 2, further comprising at least one transitional corrective prescription between the separate corrective prescriptions.

6. The lens of claim 5, further comprising a plurality of transitional corrective prescriptions between separate corrective prescriptions.

7. The lens of claim 1, further comprising a continuously variable corrective prescription.

8. The lens of claim 1, further comprising a flattened lower portion of the lens.

9. The lens of claim 1, further comprising at least one ballast zone to prevent rotation of the lens.

10. The lens of claim 1, further comprising a first corrective prescription at least partially surrounding a second corrective prescription.

11. The lens of claim 10, in which the first corrective prescription completely surrounds the second corrective prescription.

12. The lens of claim 10, further comprising a transitional corrective prescription between the first corrective prescription and the second corrective prescription.

13. A contact lens of sufficient size such that the lower portion of the lens is in close proximity to the lower fornix of the eye, comprising:
 a. a flattened lower portion of the lens to stabilize the lens against said lower fornix, which flattened lower portion sits behind the lower eyelid of said eye but contains no depression to accommodate said lower eyelid or any portion thereof; and
 b. a plurality of corrective prescriptions arranged vertically on the lens.

* * * * *